(12) United States Patent
Kondo et al.

(10) Patent No.: US 8,103,114 B2
(45) Date of Patent: Jan. 24, 2012

(54) IMAGE PROCESSING APPARATUS, METHOD, STORAGE MEDIUM, AND PROGRAM

(75) Inventors: Tetsujiro Kondo, Tokyo (JP); Yasushi Tatehira, Kanagawa (JP); Junichi Ishibashi, Saitama (JP); Seiji Wada, Kanagawa (JP); Yasuhiro Suto, Tokyo (JP)

(73) Assignee: Sony Corporation, Tokyo (JP)

( * ) Notice: Subject to any disclaimer, the term of this patent is extended or adjusted under 35 U.S.C. 154(b) by 1349 days.

(21) Appl. No.: 11/672,616

(22) Filed: Feb. 8, 2007

(65) Prior Publication Data

US 2007/0127828 A1    Jun. 7, 2007

Related U.S. Application Data

(62) Division of application No. 10/677,537, filed on Oct. 3, 2003, now Pat. No. 7,636,481.

(30) Foreign Application Priority Data

Oct. 9, 2002  (JP) ................................. 2002-296135
Oct. 9, 2002  (JP) ................................. 2002-296136
Oct. 9, 2002  (JP) ................................. 2002-296137

(51) Int. Cl.
*G06K 9/36* (2006.01)
(52) U.S. Cl. .................................. 382/236; 375/240.15
(58) Field of Classification Search .......... 382/232–253; 375/240–241
See application file for complete search history.

(56) References Cited

U.S. PATENT DOCUMENTS

| 4,703,352 | A | 10/1987 | Kondo |
| 4,710,811 | A | 12/1987 | Kondo |
| 4,754,490 | A * | 6/1988 | Swonger ........................ 382/170 |
| 6,192,080 | B1 * | 2/2001 | Sun et al. .................. 375/240.16 |
| 6,766,059 | B1 * | 7/2004 | Kondo ........................... 382/236 |
| 7,800,624 | B2 * | 9/2010 | Kondo et al. ................. 345/565 |
| 2004/0252125 | A1 * | 12/2004 | Kondo et al. ................. 345/530 |
| 2005/0008195 | A1 * | 1/2005 | Kondo et al. ................. 382/107 |
| 2005/0226462 | A1 * | 10/2005 | Wittebrood et al. .......... 382/103 |

FOREIGN PATENT DOCUMENTS

| EP | 1006732 A2 * | 6/2000 |
| JP | 8-251600 | 9/1996 |

OTHER PUBLICATIONS

Patent Abstracts of Japan, JP 07-087494, Mar. 31, 1995.
Patent Abstracts of Japan, JP 07-059093, Mar. 31, 1995.
Patent Abstracts of Japan, JP 61-107886, May 26, 1986.
U.S. Appl. No. 11/672,283, filed Feb. 7, 2007, Kondo, et al.

* cited by examiner

*Primary Examiner* — Bhavesh Mehta
*Assistant Examiner* — Sean Motsinger
(74) *Attorney, Agent, or Firm* — Oblon, Spivak, McClelland, Maier & Neustadt, L.L.P.

(57) ABSTRACT

A motion-vector detector determines the centroid of pixels on a reference frame that is identified with position information set in a database and associated with a feature address corresponding to a feature of a target pixel. The motion-vector detector detects, as a motion vector of the target pixel, a vector that has a starting point at a pixel on the reference frame which corresponds to the target pixel on a current frame and has an end point at the determined centroid. The present invention can be applied to an apparatus for generating a motion vector and allows prompt detection of a motion vector.

5 Claims, 17 Drawing Sheets

FIG. 5

|  FLAG ADDRESS<br>FEATURE ADDRESS | 0 | 1 | 2 | ... | b |
|---|---|---|---|---|---|
| 0 | □<br>(0, 0) | □<br>(0, 1) | □<br>(0, 2) | ... | □<br>(0, b) |
| 1 | □<br>(1, 0) | □<br>(1, 1) | □<br>(1, 2) | ... | □<br>(1, b) |
| 2 | □<br>(2, 0) | □<br>(2, 1) | | | ⋮ |
| ⋮ | ⋮ | ⋮ | | | |
| a | □<br>(a, 0) | □<br>(a, 1) | | ... | □<br>(a, b) |

~71

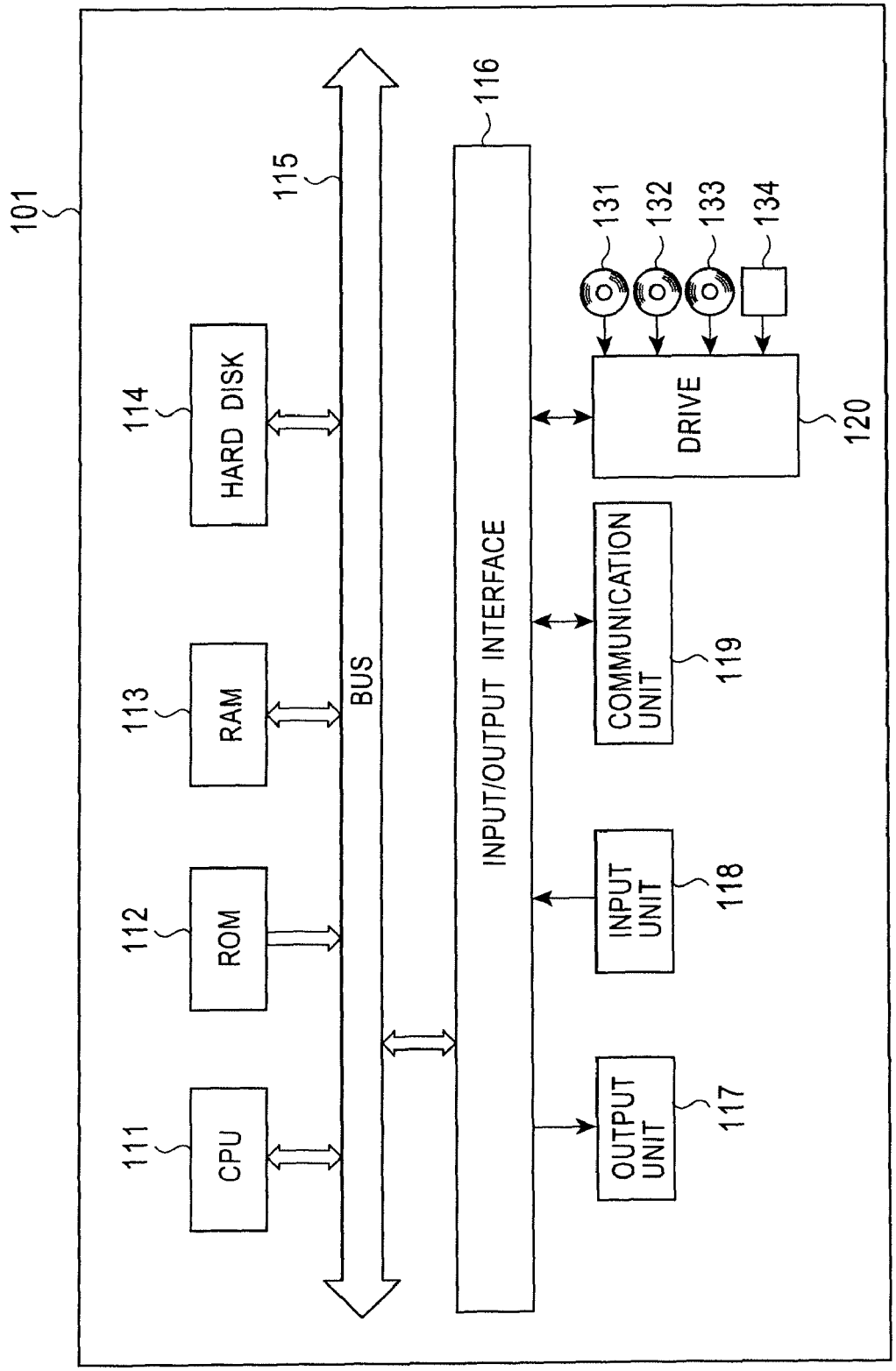

IMAGE PROCESSING APPARATUS, METHOD, STORAGE MEDIUM, AND PROGRAM

CROSS-REFERENCE TO RELATED APPLICATIONS

The present application is a divisional application of Ser. No. 10/677,537 filed Oct. 3, 2003, the entire contents of which are incorporated herein by reference. This application is based upon and claims the benefit of priority from the prior Japanese Patent Application No. 2002-296135, filed Oct. 9, 2002, Japanese Patent Application No. 2002-296136, filed Oct. 9, 2002, and Japanese Patent Application No. 2002-296137, filed Oct. 9, 2002, the entire contents of which are incorporated herein by reference.

BACKGROUND OF THE INVENTION

1. Field of the Invention

This invention relates to image processing apparatuses, methods, storage media, and programs. More particularly, the present invention relates to an information processing apparatus, a method, a storage medium, and a program which are capable of promptly detecting a motion vector.

2. Description of the Related Art

FIG. 1 shows an example of the configuration of a known motion detector 1 of an image processing apparatus that compresses a moving picture by utilizing a motion vector indicating the motion of the image (e.g., refer to Japanese Patent Nos. 3277417 and 3271387 and Japanese Examined Patent Application Publication No. 5-62876).

A frame memory 11 stores one-frame image information of an image signal input via an input terminal Tin, and also outputs stored image information to a frame memory 12 and a motion-vector detector 13 when storing the next frame image information that is input.

The frame memory 12 stores one-frame image information input from the frame memory 11, and outputs stored image information to the motion-vector detector 13 when storing the next frame image information that is input from the frame memory 11.

The motion-vector detector 13 uses the one-frame image information input from the frame memory 11 as the image information of a current frame Fc and uses one-frame image information (i.e., the image information of a frame that is one-frame earlier than the frame input from the frame memory 11) input from the frame memory 12 as the image information of a reference frame Fr to thereby detect a motion vector by block matching. The motion-vector detector 13 outputs the detected motion vector via an output terminal Tout.

A block matching algorithm will now be described with reference to FIG. 2. For example, a base block Bb is provided on the current frame Fc and has L pixels×L pixels with a pixel (a target pixel) P(i, j) being the center. The target pixel is observed for detection of a motion vector. Further, a search area SR is provided on the reference frame Fr so as to correspond to the target pixel P(i,j), and reference blocks Brn (n=1, 2, ... m), which have L pixels×L pixels, are provided within the search area SR.

The sum of absolute differences between individual pixels of the base block Bb and individual pixels of the reference block Brn is calculated for each of the reference blocks Br1 to Brm (the number of reference blocks Brn within the search area SR is assumed to be m) that are provided by movement of the reference block Brn pixel by pixel in the horizontal or vertical direction throughout the search area SR.

A reference block Br from which the thus-calculated sum of absolute differences between the pixels of the base block Bb and the pixels of the reference block Brn becomes a minimum is determined as a reference block Br that is the closest (the most similar) to the base block Bb. Then, a vector that has a starting point at a pixel P' (i, j) on the reference frame Fr which corresponds to the target pixel P (i, j) on the current frame Fc and that has an end point at the center pixel Pn (i,j) of the reference block Brn that is detected as being the closest to the base block Bb is output as a motion vector V (Vx, Vy) of the target pixel P(i, j).

Next, a motion detection process of the motion detector 1 shown in FIG. 1 will be described with reference to the flow chart of FIG. 3.

In step S1, the motion-vector detector 13 sets a search area SR according to the pixel position of the target pixel p (i, j) on the current frame Fc input from the frame memory 11.

In step S2, the motion-vector detector 13 initializes a variable min for setting the minimum value of the sum of absolute differences between the pixel values of pixels of the base block Bb and the pixel values of pixels of the reference block Brn. Specifically, the variable min is set to a value that is obtained by multiplying the number of gray levels of a pixel by the number of pixels constituting the base block Bb. For example, when one pixel has 8-bit data and the base block Bb is constituted by 3 pixels×3 pixels, the number of gray levels of one pixel is 256 gray levels (256 colors) (=2 to the eighth power) and the number of pixels is 9, so that the variable min is initialized to 2304(=256×9).

In step S3, the motion-vector detector 13 initializes a counter variable n, which is used for counting of the number of generated reference blocks Br, to "1".

In step S4, the motion-vector detector 13 initializes a variable sum, to which the sum of absolute differences between the pixels of the base block Bb and the reference block Brn is assigned, to "0".

In step S5, the motion-vector detector 13 calculates the sum of absolute differences between the pixels of the base block Bb and the reference block Brn. That is, the motion-vector detector 13 calculates the sum of absolute differences between the pixels of the base block Bb and the reference block Brn by performing an operation shown in expression (1). In expression (1), P_Bb (i, j) represents each pixel of the base block Bb and P_Brn (i, j) represents each pixel of the reference block Brn.

$$\text{sum} = \sum_{i=1}^{L} \sum_{j=1}^{L} |(P\_Bb(i, j)) - (P\_Brn(i, j))| \qquad (1)$$

In step S6, the motion-vector detector 13 determines whether the variable min is greater than the variable sum. When it is determined that the variable min is greater, the process proceeds to step S7, in which the variable min is replaced with the variable sum and the value of the counter variable n at this point is registered as a motion vector number. That is, when the just-obtained variable sum indicating the sum of absolute differences, is smaller than the variable min indicating the minimum value, it is possible to estimate that the reference block Br that is currently calculated is the most similar to the base block Bb than any other reference blocks Br that have been calculated so far. Thus, that reference block Br is regarded as a candidate for determining the motion vector and the counter variable n at this point is registered as a motion vector number.

In step S6, when it is determined that the variable min is not greater than the variable sum, the process skips step S7.

In step S8, the motion-vector detector 13 determines whether the counter variable n is equal to the total number m of the reference blocks Br within the search area SR, i.e., whether the current reference block Br is the reference block Brm. For example, when it is determined that the counter variable n is not equal to the total number m, in step S9, the counter variable n is incremented by "1" and the process returns to step S4.

In step S8, when it is determined that the counter variable n is equal to the total number m of the reference blocks Br within the search area SR, i.e., when it is determined that the current reference block Br is the reference block Brm, in step S10, the motion-vector detector 13 outputs a motion vector according to the registered motion vector number. That is, steps S4 to S9 are repeated so that the counter variable n corresponding to the reference block Brn from which the sum of absolute differences becomes a minimum is registered as a motion vector number. Thus, the motion-vector detector 13 determines, as a motion vector V(Vx, Vy) of the target pixel P(i, j), a vector that has a starting point at a pixel P' (i, j) on the reference frame Fr which corresponds to the target pixel P (i, j) on the current frame Fc and that has an end point at the center pixel Pn (i, j) of the reference block Brn which corresponds to the motion vector number and outputs the determined vector.

The above-described block matching, however, has a problem in that a motion vector cannot be promptly detected because of an enormous amount of computation required for expression (1).

SUMMARY OF THE INVENTION

The present invention has been made in view of the foregoing situation, and an object of the present invention is to promptly and accurately detect a motion vector.

The present invention provides an image processing apparatus for compressing an input image using a motion vector. The image processing apparatus includes a storing unit for storing position information of pixels of a first frame that is earlier in time than a second frame for each address corresponding to a feature of each pixel, a first detecting unit for detecting the position information stored at an address corresponding to a feature of a target pixel of the second frame, a determining unit for determining a centroid of candidate pixels of the first frame which are identified with the position information detected by the first detecting unit, and a second detecting unit for detecting a motion vector of the target pixel from the position of the target pixel and the centroid.

The present invention provides an image processing method for an image processing apparatus that compresses an input image using a motion vector. The method includes a storing step of storing position information of pixels of a first frame that is earlier in time than a second frame for each address corresponding to a feature of each pixel, a first detecting step of detecting the position information stored at an address corresponding to a feature of a target pixel of the second frame, a determining step of determining a centroid of candidate pixels of the first frame which are identified with the position information detected in the first detecting step, and a second detecting step of detecting a motion vector of the target pixel from the position of the target pixel and the centroid.

The present invention provides a recording medium in which a computer-readable program for compressing an input image using a motion vector is recorded. The program includes a storage controlling step of controlling storage of position information of pixels of a first frame that is earlier in time than a second frame for each address corresponding to a feature of each pixel, a first detection controlling step of controlling detection of the position information stored at an address corresponding to a feature of a target pixel of the second frame, a determination controlling step of controlling determination of a centroid of candidate pixels of the first frame which are identified with the position information detected in the first detection controlling step, and a second detection controlling step of controlling detection of a motion vector of the target pixel from the position of the target pixel and the centroid.

The present invention provides a program for causing a computer to compress an input image using a motion vector. The program includes a storage controlling step of controlling storage of position information of pixels of a first frame that is earlier in time than a second frame for each address corresponding to a feature of each pixel, a first detection controlling step of controlling detection of the position information stored at an address corresponding to a feature of a target pixel of the second frame, a determination controlling step of controlling determination of a centroid of candidate pixels of the first frame which are identified with the position information detected in the first detection controlling step, and a second detection controlling step of controlling detection of a motion vector of the target pixel from the position of the target pixel and the centroid.

In the image processing apparatus, method, and program of the present invention, position information of pixels of a first frame that is earlier in time than a second frame is stored for each address corresponding to a feature of each pixel, and the position information stored at an address corresponding to a feature of a target pixel of the second frame is detected. Further, a centroid of candidate pixels of the first frame which are identified with the detected position information is determined, and a motion vector of the target pixel is detected from the position of the target pixel and the centroid.

The present invention provides an image processing apparatus for compressing an input image using a motion vector. The image processing apparatus includes a storing unit for storing position information of pixels of a first frame that is earlier in time than a second frame for each address corresponding to a feature of each pixel, a first detecting unit for detecting the position information stored at an address corresponding to a feature of a target pixel of the second frame, and a determining unit for determining vectors from the position of the target pixel and the positions of candidate pixels of the first frame which are identified with the position information detected by the first detecting unit. The image processing apparatus further includes a second detecting unit for detecting, as a motion vector of the target pixel, one of the vectors which is the closest to an earlier motion vector of the target pixel in time.

The present invention provides an image processing method for an image processing apparatus that compresses an input image using a motion vector. The method includes a storing step of storing position information of pixels of a first frame that is earlier in time than a second frame for each address corresponding to a feature of each pixel, a first detecting step of detecting the position information stored at an address corresponding to a feature of a target pixel of the second frame, and a determining step of determining vectors from the position of the target pixel and the positions of candidate pixels of the first frame which are identified with the position information detected in the first detecting step. The method further includes a second detecting step of detecting, as a motion vector of the target pixel, one of the vectors which is the closest to an earlier motion vector of the target pixel in time.

The present invention provides a recording medium in which a computer-readable program for compressing an input image using a motion vector is recorded. The program includes a storage controlling step of controlling storage of position information of pixels of a first frame that is earlier in time than a second frame for each address corresponding to a feature of each pixel, a first detection controlling step of controlling detection of the position information stored at an address corresponding to a feature of a target pixel of the second frame, a determination controlling step of controlling determination of vectors from the position of the target pixel and the positions of candidate pixels of the first frame which are identified with the position information detected in the first detection controlling step, and a second detection controlling step of controlling detection of one of the vectors which is the closest to an earlier motion vector of the target pixel in time, as a motion vector of the target pixel.

The present invention provides a program for causing a computer to compress an input image using a motion vector. The program includes a storage controlling step of controlling storage of position information of pixels of a first frame that is earlier in time than a second frame for each address corresponding to a feature of each pixel, a first detection controlling step of controlling detection of the position information stored at an address corresponding to a feature of a target pixel of the second frame, and a determination controlling step of controlling determination of vectors from the position of the target pixel and the positions of candidate pixels of the first frame which are identified with the position information detected in the first detection controlling step. The program further includes a second detection controlling step of controlling detection of one of the vectors which is the closest to an earlier motion vector of the target pixel in time, as a motion vector of the target pixel.

In the image processing apparatus, method, and program of the present invention, position information of pixels of a first frame that is earlier in time than a second frame is stored for each address corresponding to a feature of each pixel, and the position information stored at an address corresponding to a feature of a target pixel of the second frame is detected. Further, vectors are determined from the position of the target pixel and the positions of candidate pixels of the first frame which are identified with the position information detected by the first detecting unit, and one of the vectors which is the closest to an earlier motion vector of the target pixel in time is detected as a motion vector of the target pixel.

The present invention provides an image processing apparatus for compressing an input image using a motion vector. The image processing apparatus includes a storing unit for storing position information of pixels of a first frame that is earlier in time than a second frame for each address corresponding to a feature of each pixel, a first detecting unit for detecting the position information stored at an address corresponding to a feature of a target pixel of the second frame, a determining unit for determining differences between a pixel value of the target pixel and pixel values of candidate pixels of the first frame which are identified with the position information detected by the first detecting unit, and a second detecting unit for detecting a motion vector of the target pixel from the position of the target pixel and the position of one of the candidate pixels when a minimum of the differences is determined.

The image processing apparatus may further include a setting unit for setting a search area corresponding to the position of the target pixel, and the determining unit may determine differences between the pixel value of the target pixel and the pixel values of the candidate pixels located within the search area.

The determining unit may perform matching processing between a base block including the target pixel and a reference block including the candidate pixels, and the second detecting unit may detect the motion vector of the target pixel from the position of the target pixel and the positions of the candidate pixels included in the reference block that is determined by the matching processing to be best matched with the base block.

The present invention provides an image processing method for an image processing apparatus that compresses an input image using a motion vector. The method includes a storing step of storing position information of pixels of a first frame that is earlier in time than a second frame for each address corresponding to a feature of each pixel, a first detecting step of detecting the position information stored at an address corresponding to a feature of a target pixel of the second frame, a determining step of determining differences between a pixel value of the target pixel and pixel values of candidate pixels of the first frame which are identified with the position information detected in the first detecting step, and a second detecting step of detecting a motion vector of the target pixel from the position of the target pixel and the position of one of the candidate pixels when a minimum of the differences is determined.

The present invention provides a recording medium in which a computer-readable program for compressing an input image using a motion vector is recorded. The program includes a storage controlling step of controlling storage of position information of pixels of a first frame that is earlier in time than a second frame for each address corresponding to a feature of each pixel, a first detection controlling step of controlling detection of the position information stored at an address corresponding to a feature of a target pixel of the second frame, a determination controlling step of controlling determination of differences between a pixel value of the target pixel and pixel values of candidate pixels of the first frame which are identified with the position information detected in the first detection controlling step, and a second detection controlling step of controlling detection of a motion vector of the target pixel from the position of the target pixel and the position of one of the candidate pixels when a minimum of the differences is determined.

The present invention provides a program for causing a computer to compress an input image using a motion vector. The program includes a storage controlling step of controlling storage of position information of pixels of a first frame that is earlier in time than a second frame for each address corresponding to a feature of each pixel, a first detection controlling step of controlling detection of the position information stored at an address corresponding to a feature of a target pixel of the second frame, a determination controlling step of controlling determination of differences between a pixel value of the target pixel and pixel values of candidate pixels of the first frame which are identified with the position information detected in the first detection controlling step, and a second detection controlling step of controlling detection of a motion vector of the target pixel from the position of the target pixel and the position of one of the candidate pixels when a minimum of the differences is determined.

In the image processing apparatus, method, and program of the present invention, position information of pixels of a first frame that is earlier in time than a second frame is stored for each address corresponding to a feature of each pixel, and the position information stored at an address corresponding to a feature of a target pixel of the second frame is detected. Further, differences between a pixel value of the target pixel and pixel values of candidate pixels of the first frame which are identified with the detected position information are determined, and a motion vector of the target pixel is detected from the position of the target pixel and the position of one of the candidate pixels when a minimum of the differences is determined.

BRIEF DESCRIPTION OF THE DRAWINGS

FIG. 5 is a schematic diagram showing the data structure of a database shown in FIG. 4;

FIG. 17 is a block diagram showing an example of the configuration of a personal computer.

DESCRIPTION OF THE PREFERRED EMBODIMENTS

Figure 1:
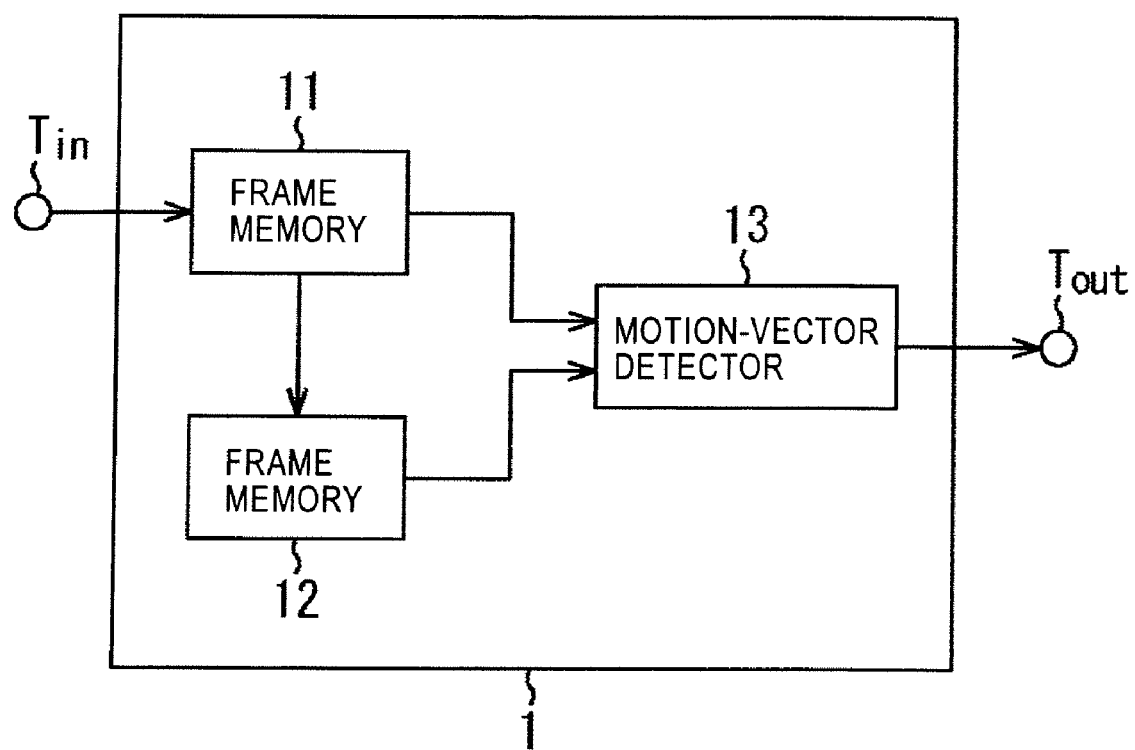
FIG. 1 shows an example of the configuration of a motion detector relevant to the present invention.
Figure 2:
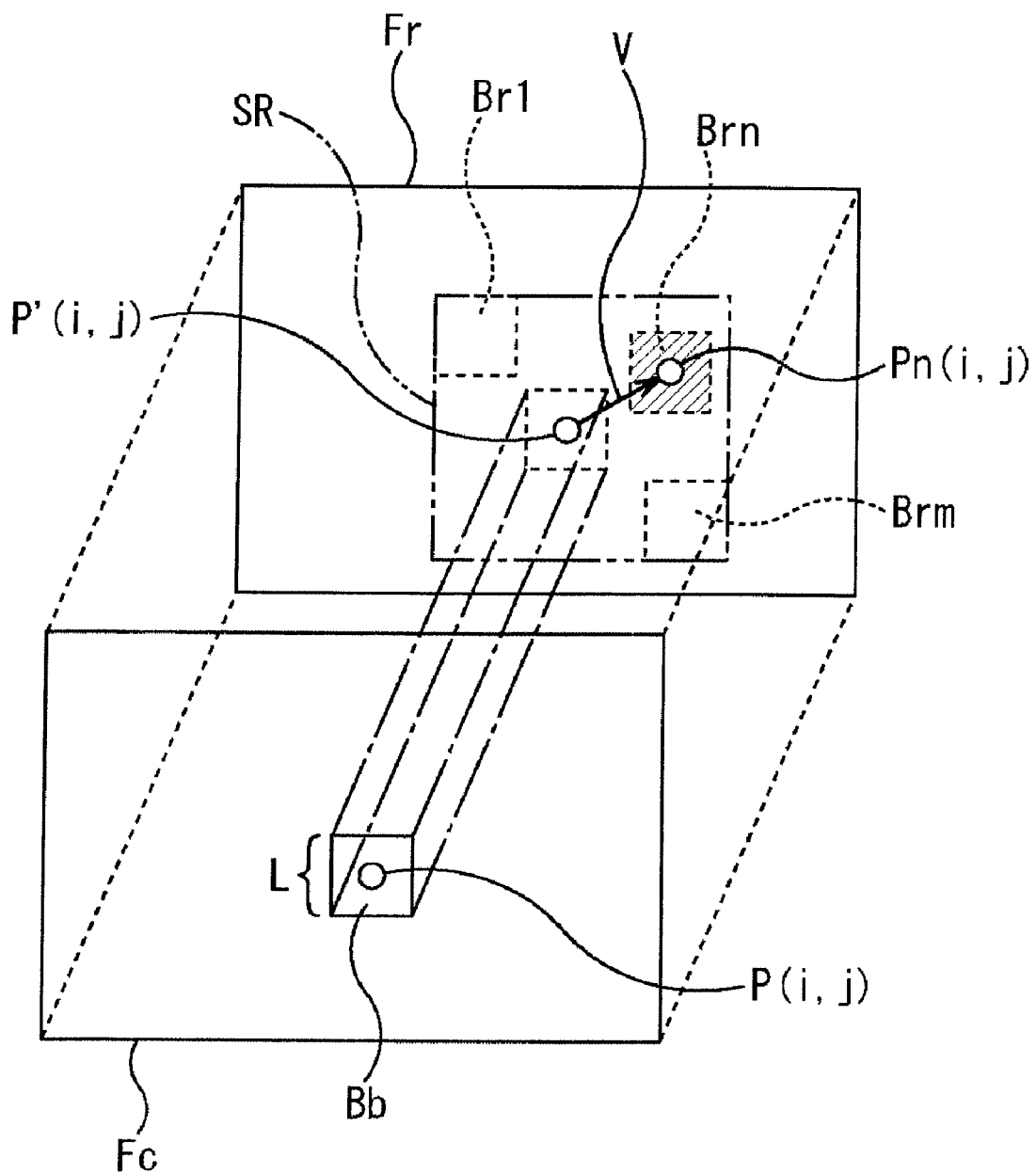
FIG. 2 is a schematic view illustrating a block matching algorithm.
Figure 3:
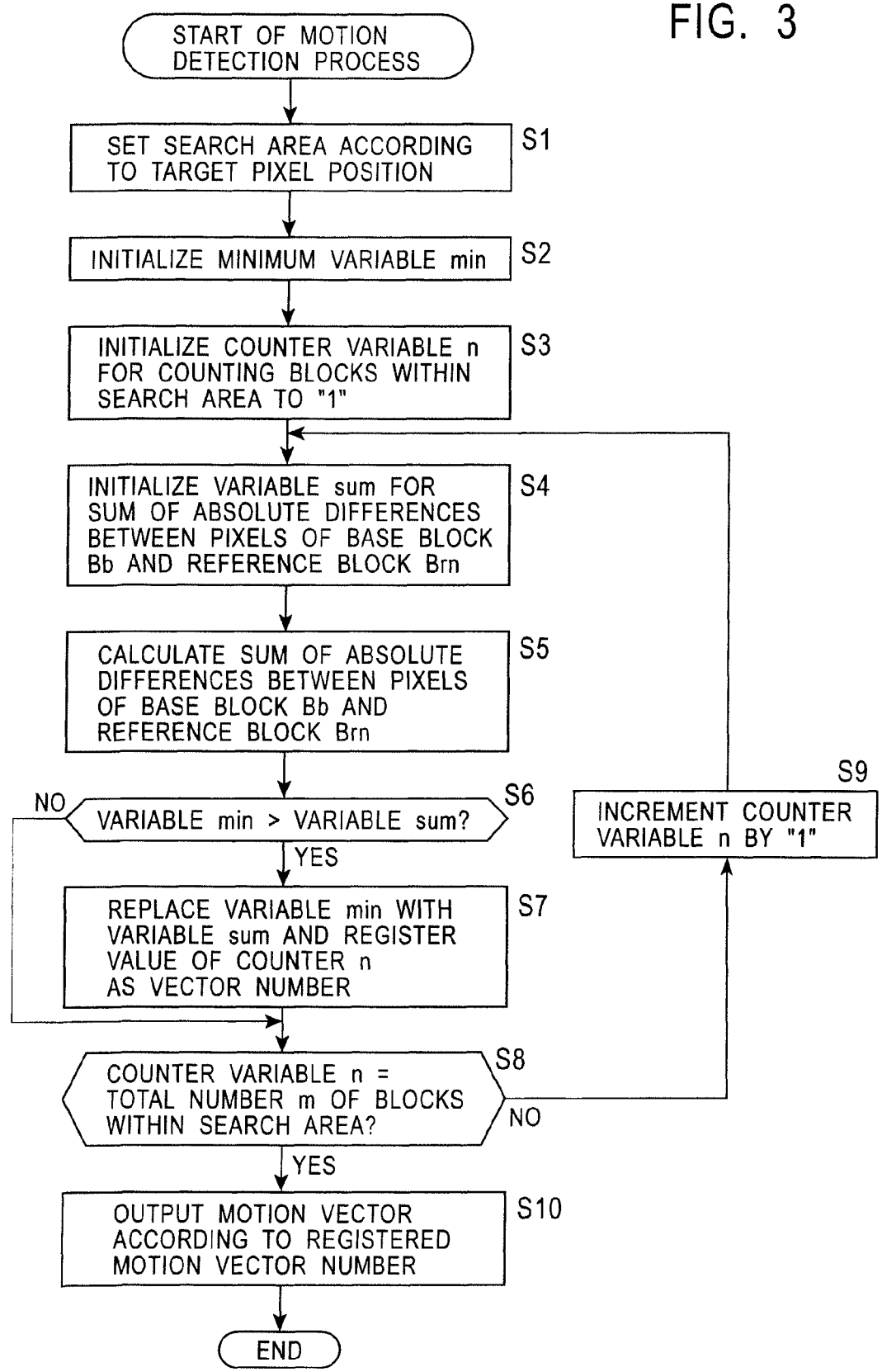
FIG. 3 is a flow chart illustrating a motion detection process relevant to the present invention.
Figure 4:
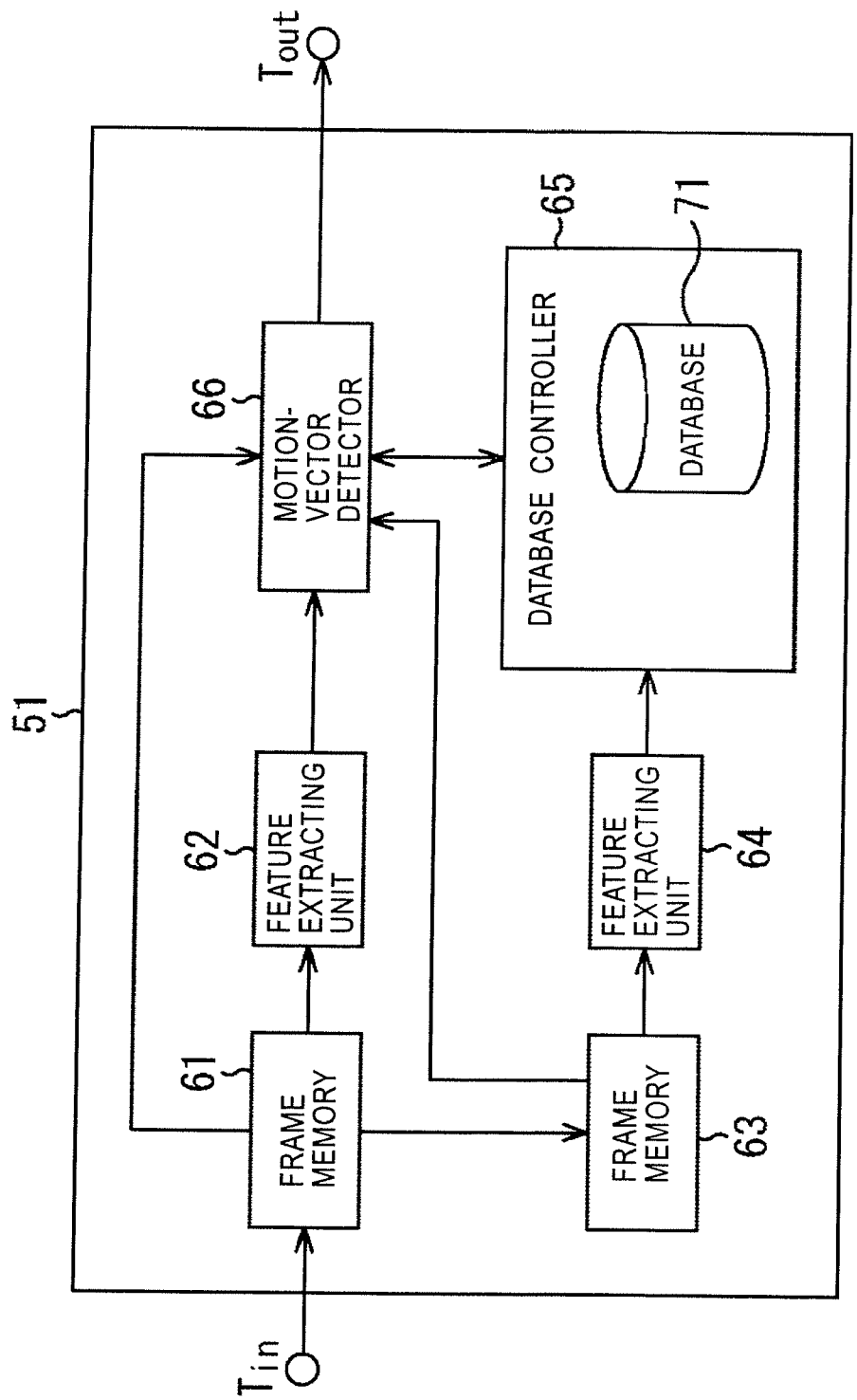
FIG. 4 is a block diagram showing an example of the configuration of a motion detector according to the present invention.

FIG. 4 shows an example of the configuration of a motion detector 51 of an image processing apparatus according to the present invention. The image processing apparatus efficiently compresses a moving image by utilizing a motion vector indicating the motion of the image.

A frame memory 61 stores one-frame image information of an image signal input via an input terminal Tin, and outputs stored image information to a feature extracting unit 62 and a frame memory 63 when storing the next frame image information that is input.

The feature extracting unit 62 extracts a feature of a pixel (a target pixel P), which is observed for detection of a motion vector, on a frame (a current frame Fc) that is supplied from the frame memory 61. Specifically, for example, as shown in expression (2), the value of function f of the pixel values of the target pixel P and eight peripheral pixels is used as a feature. In expression (2), i indicates the vertical direction, j indicates the horizontal direction, and Li, j indicates the pixel value of a position (i, j).

$$f(L_{i-1,j-1}, L_{i-1,j}, L_{i-1,j-1}, L_{i,j-1}, L_{i,j}, L_{i,j+1}, L_{i+1,j-1}, L_{i+1,j}, L_{i+1,j+1}) \quad (2)$$

The feature extracting unit 62 outputs the extracted feature to a motion-vector detector 66.

The frame memory 63 stores the one-frame image information input from the frame memory 61, and outputs stored image information to a feature extracting unit 64 when storing the next frame image information input from the frame memory 61.

The feature extracting unit 64 extracts a feature of each pixel on the frame (a reference frame Fr) that is input from the frame memory 63 as in the case in which the feature extracting unit 62 extracts a feature of the target pixel P (The reference frame Fr is a frame that is one frame earlier than the frame of the target pixel from which the feature is extracted by the feature extracting unit 62). The feature extracting unit 64 supplies the extracted feature of each pixel on the reference frame Fr to a database controller 65 in conjunction with the position information (e.g., coordinate information).

The database controller 65 has a database 71. As shown in FIG. 5, the database 71 has a×b cells indicated by feature addresses 0 to a and flag addresses 0 to b. The database controller 65 associates the position information, supplied from the feature extracting unit 64, of the pixels of the reference frame Fr, with the feature addresses corresponding to features supplied therewith and stores the resulting position information in the order of the flag addresses 1 to b. At flag address 0, the number of pieces of position information which are currently stored in the feature addresses is stored.

For example, in the case in which one piece of position information is stored at feature address 1 (and stored at flag address 1) and "1" is stored at flag address 0 (cell (1, 0)), when a feature corresponding to feature address 1 is input, position information input together with the feature is stored at flag address 2 (cell (1, 2)) corresponding to feature address 1 and the value of flag address 0 (cell (1, 0)) is incremented to "2".

Referring back to FIG. 4, the motion-vector detector 66 uses the feature, supplied from the feature extracting unit 62, of the target pixel P on the current frame Fc and reference-frame information (hereinafter referred to as "reference-frame feature information") set in the database 71 of the database controller 65, to thereby detect a motion vector corresponding to the target pixel P.

For example, the motion-vector detector 66 determines the centroid of pixels (hereinafter referred to "candidate pixels" as appropriate) on the reference frame Fr that is identified with position information that is associated with a feature address corresponding to the feature of the target pixel P and that is set in the database 71. The motion-vector detector 66 detects, as a motion vector of the target pixel P, a vector that has a starting point at a pixel on the reference frame Fr which corresponds to the target pixel P on the current frame Fc and that has an end point at the determined centroid.

The motion-vector detector 66 also determines vectors from the position of the target pixel P on the current frame Fc and the positions of pixels (hereinafter referred to as "candidate pixels" as appropriate) on the reference frame Fr which are identified with the position information set in the database 71 and associated with the feature address corresponding to the feature of the target pixel P. Then, the motion-vector detector 66 may be configured to detect a candidate pixel (reference pixel) when a vector that is the closest to the previous vector of the target pixel P is determined and to detect, as a motion vector of the target pixel P, a vector that has a starting point at a pixel on the reference frame Fr which corresponds to the target pixel P on the current frame Fc and that has an end point at the reference pixel.

The motion-vector detector 66 calculates the absolute differences between the pixel value of the target pixel P on the current frame Fc and the pixel values of individual pixels (hereinafter referred to as "candidate pixels" as appropriate) on the reference frame Fr which are identified with position information set in the database 71 and associated with the feature address corresponding to the feature of the target pixel P. Then, the motion-vector detector 66 may be configured to detect a candidate pixel (reference pixel) when the minimum value of the absolute differences is determined and to detect, as a motion vector of the target pixel P, a vector that has a starting point at a pixel on the reference frame Fr which corresponds to the target pixel P on the current frame Fc and that has an end point at the reference pixel.

Figure 6:
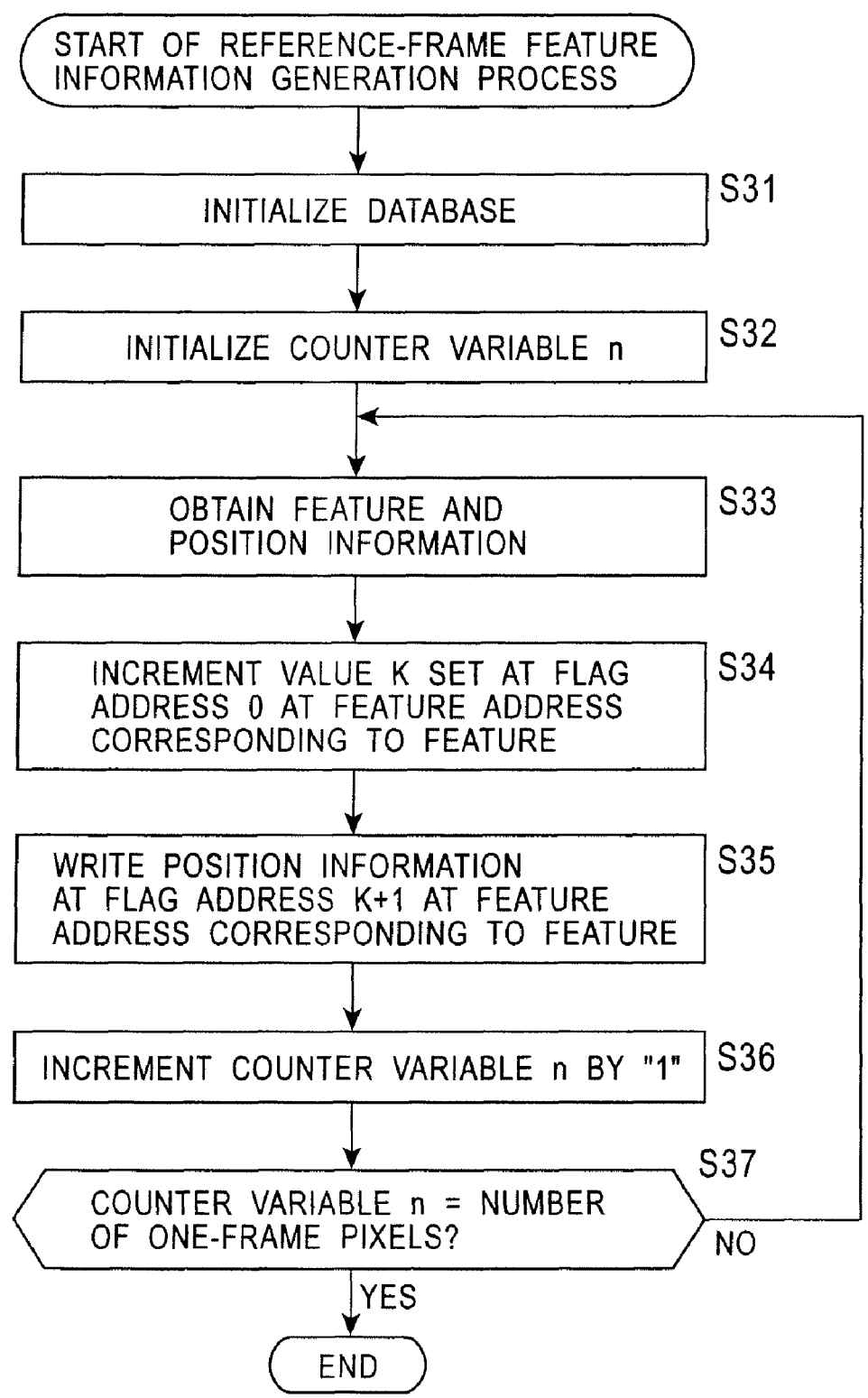
FIG. 6 is a flow chart illustrating a database generation process.

The operation of the database controller 65 for generating the database 71 (reference-frame feature information) will now be described with reference to the flow chart shown in FIG. 6.

In step S31, the database controller 65 initializes the database 71. Thus, "0" is written in all cells with flag address 0 and position information stored at flag addresses 1 to b is erased.

Next, in step S32, the database controller 65 initializes the counter variable n, which is used to count the number of pixels within a frame, to "0".

In step S33, the database controller 65 obtains a feature and the position information of one pixel on the reference frame Fr from the feature extracting unit 64.

Next, in step S34, the database controller 65 detects a feature address corresponding to the obtained feature from the database 71 and increments a value K at the detected feature address by "1", the value K being set at flag address 0.

In step S35, the database controller 65 sets the position information obtained in step S33 at flag address K+1 at the feature address detected in step S34.

In step S36, the database controller 65 increments the counter variable n by "1".

Next, in step S37, the database controller 65 determines whether the counter variable n is equal to the number of pixels of one frame. When it is determined that the counter variable n is not equal to the number of pixels of one frame, the process returns to step S33 and the processing thereafter is performed. In step S37, when it is determined that the counter variable n is equal to the number of pixels of one frame, i.e., when position information of individual pixels of the reference frame Fr is set in the database 71 and is associated with a feature address corresponding to the feature thereof, the process ends.

As described above, the database 71 (including reference-frame feature information) is generated.

A motion-vector detection process will now be described with reference to the flow chart shown in FIG. 7.

In step S51, the motion-vector detector 66 obtains a feature of the target pixel P of the current frame Fc from the feature extracting unit 62. In step S52, the motion-vector detector 66 reads, from the database 71 of the database controller 65, one piece of position information which is set and associated with a feature address corresponding to the feature obtained in step S51.

Next, in step S53, the motion-vector detector 66 reads the pixel value of the target pixel P from the frame memory 61. In step S54, the motion-vector detector 66 reads the pixel value of a pixel (candidate pixel) of the reference frame Fr from the frame memory 63, the pixel being identified with the position information read in step S52.

In step S55, the motion-vector detector 66 calculates the absolute difference between the target pixel P's pixel value read in step S53 and the candidate-pixel's pixel value read in step S54.

Next, in step S56, a determination is made as to whether the motion-vector detector 66 has read all position information associated with a feature address corresponding to the feature obtained in step S51. When it is determined that position information that is not read still remains, the process returns to step S52, in which the motion-vector detector 66 reads the next position information from the database 71 and the processing thereafter is executed.

In step S56, when it is determined that all position information is read (when it is determined that absolute values between the pixel value of the target pixel P and the pixel values of all candidate pixels are calculated), the process proceeds to step S57. In step S57, the motion-vector detector 66 detects a candidate pixel when the minimum value of the absolute differences calculated in step S55 is obtained.

In step S58, the motion-vector detector 66 detects, as a motion vector of the target pixel P, a vector that has a starting point at a pixel on the reference frame Fr which corresponds to the target pixel P of the current frame Fc and that has an end point at the candidate pixel (reference pixel) detected in step S57.

Figure 8:
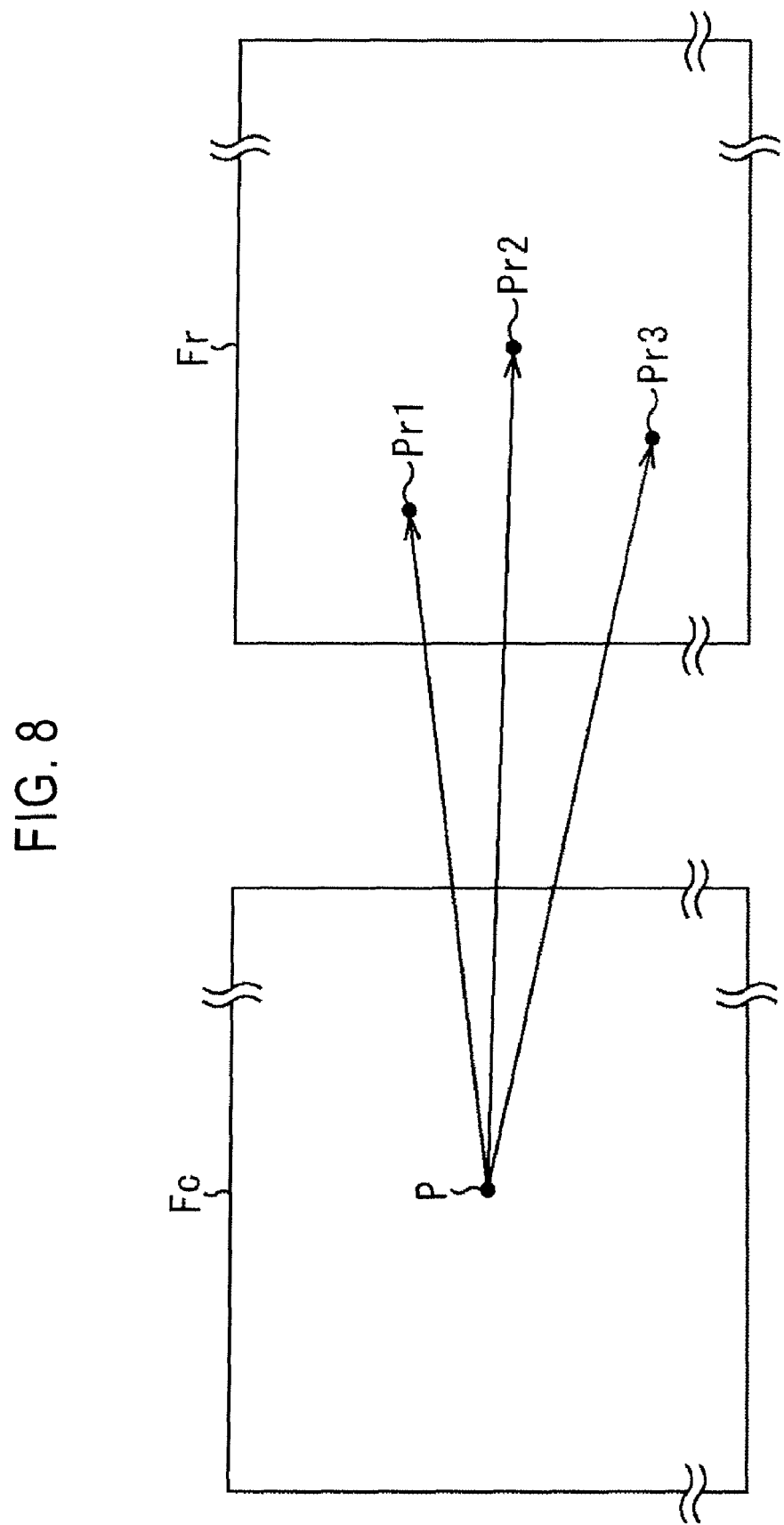
FIG. 8 is a schematic diagram illustrating the motion-vector detection process.

That is, in this motion vector detection method, for example, when position information of three candidate pixels Pr1 to Pr3 on the reference frame Fr shown in FIG. 8 is set at a feature address in the database 71 which correspond to the feature of the target pixel P on the current frame Fc shown in FIG. 8, the absolute differences between the pixel value of the target pixel P and the pixel values of the candidate pixels Pr1 to Pr3 are respectively calculated and a candidate pixel Pr from which the minimum value of the absolute differences is calculated is detected as a reference pixel. Thus, a vector that has a starting point at a pixel on the reference frame Fr which corresponds to the target pixel P of the current frame Fc and that has an end point at the detected reference pixel is detected as a motion vector of the target pixel P.

Referring back to FIG. 7, in step S59, a determination is made as to whether the motion-vector detector 66 has obtained features of all pixels of the current frame Fc from the feature extracting unit 62. When it is determined that a pixel from which a feature is not obtained still remains on the current frame Fc, the process returns to step S51, in which the motion-vector detector 66 obtains the feature of the next target pixel P and the processing thereafter is executed.

In step S59, when it is determined that the features of all pixels on the current frame Fc are obtained, i.e., when motion vectors corresponding to all pixels on the current frame Fc are detected, the process ends.

Although each candidate pixel has been described as being a pixel that is identified with position information associated with a feature address corresponding to the feature of the target pixel P, pixels around that pixel may further be used as candidate pixels.

Figure 9:
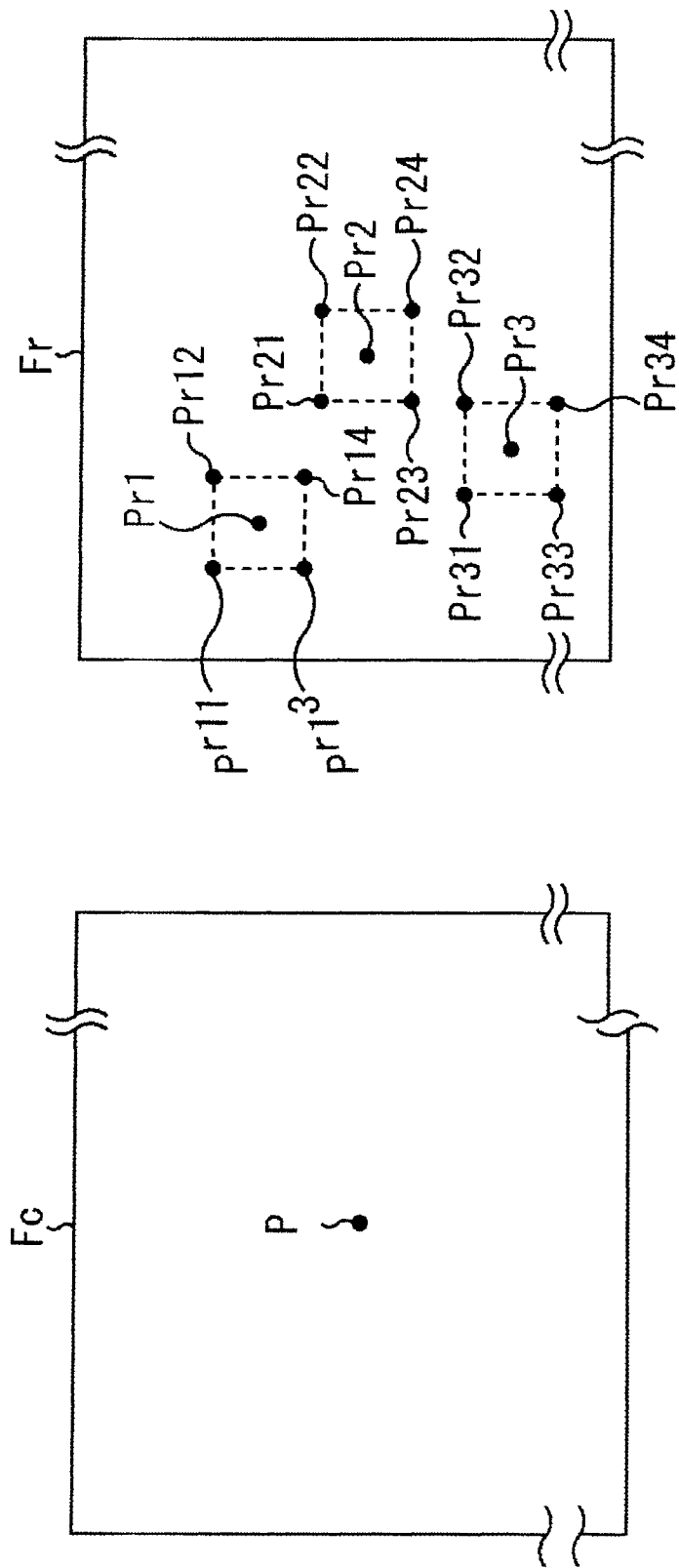
FIG. 9 is a schematic diagram illustrating a method for determining candidate pixels.

For example, in the case of an example shown in FIG. 9, the pixels Pr1 to Pr3 and pixels Pr11 to Pr14, Pr21 to Pr24, and Pr31 to Pr34 which are located at four corners of blocks that center at the pixels Pr1 to Pr3 and that have a predetermined size are used as candidate pixels.

Further, rather than using peripheral pixels of all candidate pixels, only peripheral pixels of a candidate pixel that is determined to be most reliable by a reliability evaluation of candidate pixels can be included in candidate pixels. High reliability herein means that, for example, the absolute difference between a pixel of interest and the target pixel P is the smallest.

Figure 10:
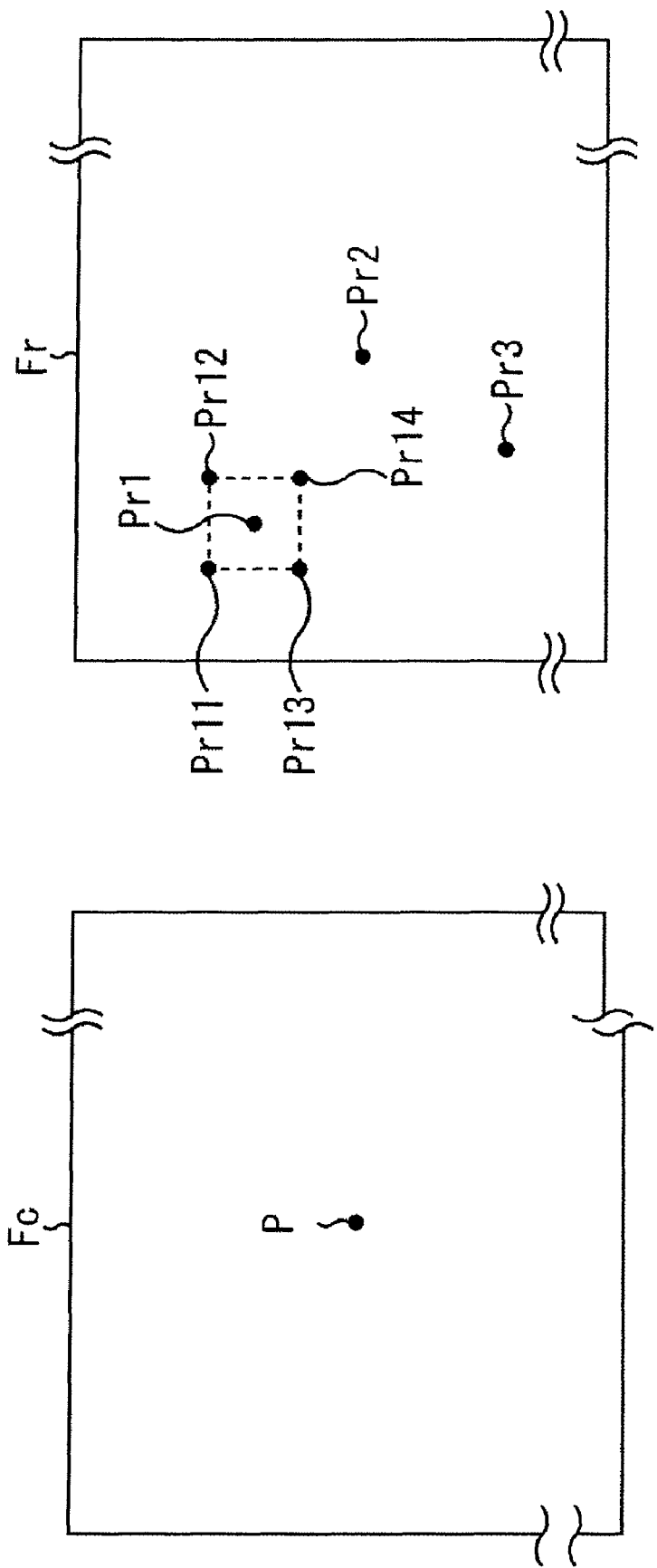
FIG. 10 is a schematic diagram illustrating another method for determining candidate pixels.

For example, in the case of FIG. 10, the pixels Pr1 to Pr3 and four pixels Pr11 to Pr14 that are located around the pixel Pr1 having the highest reliability are used as candidate pixels.

Further, as shown in FIG. 9, when pixels (hereinafter referred to as "first candidate pixels") that are identified with position information associated with a feature address corresponding to the feature of the target pixel P and the peripheral pixels (hereinafter referred to as "second candidate pixels") are used as candidate pixels, the result obtained by calculation in step S55 can be weighted in accordance with the reliabilities of the first candidate pixels.

For example, when the evaluation values of the pixels Pr1 to Pr3 are evaluation values H1 to H3, respectively, absolute differences obtained in step S55 with respect to the pixel Pr1 and the pixels Pr11 to Pr14 are multiplied by the evaluation value H1, absolute differences obtained in step S55 with respect to the pixel Pr2 and the pixels Pr21 to Pr24 are multiplied by the evaluation value H2, and absolute differences obtained in step S55 with respect to the pixel Pr3 and the pixels Pr31 to Pr34 are multiplied by the evaluation value H3.

Figure 11:
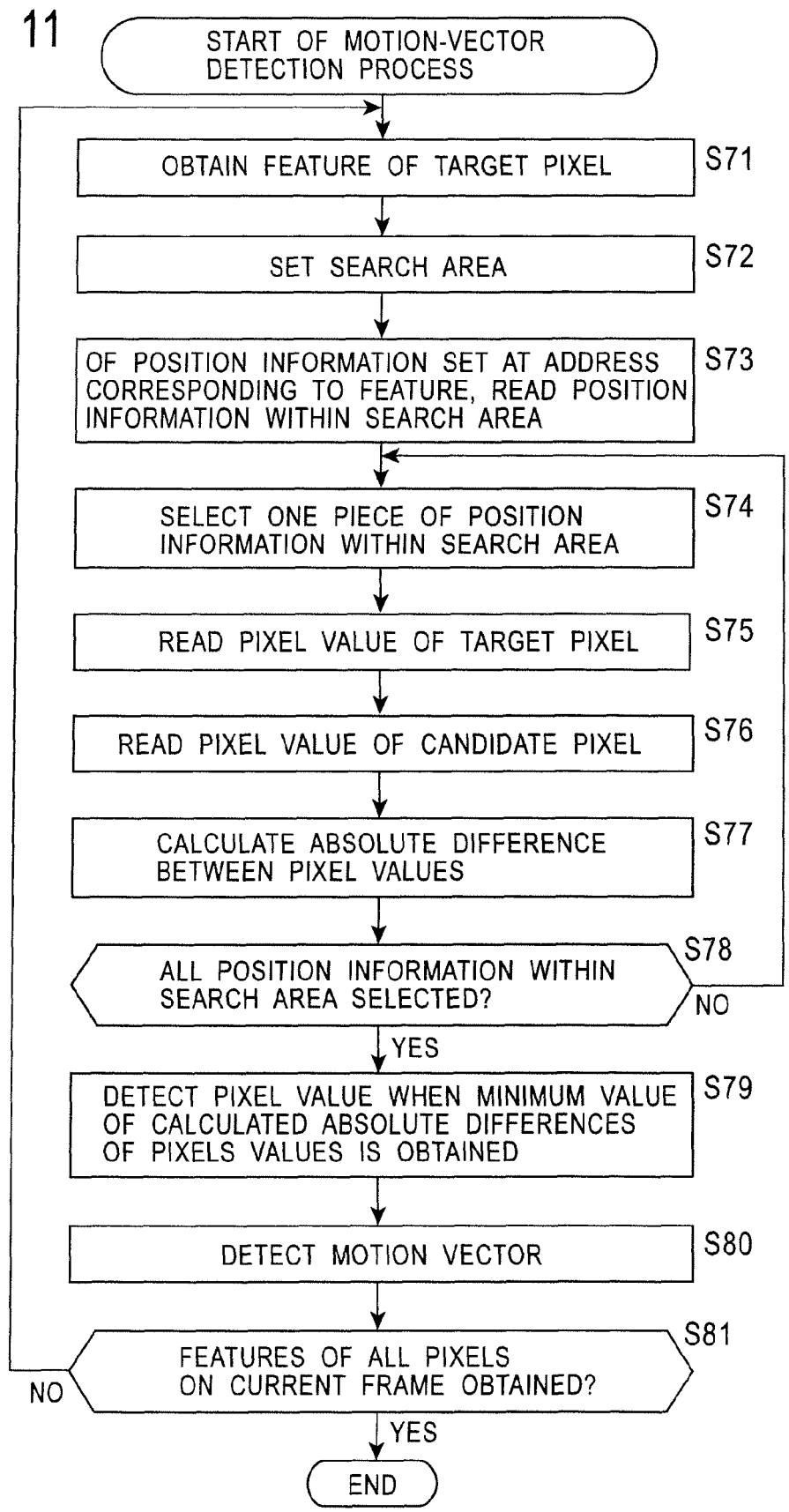
FIG. 11 is a flow chart illustrating another motion-vector detection process.

Another motion vector detection process will now be described with reference to the flow chart shown in FIG. 11.

In step S71, the motion-vector detector 66 obtains a feature of the target pixel P of the current frame Fc from the feature extracting unit 62. In step S72, the motion-vector detector 66 sets a search area SR corresponding to the position of the target pixel P.

Next, in step S73, of position information that is set in the database 71 of the database controller 65 and that is associated with a feature address corresponding to the feature obtained in step S71, the motion-vector detector 66 reads position information of pixels within the search area SR set in step S72.

In step S74, the motion-vector detector 66 selects one piece of position information read in step S73.

Figure 7:
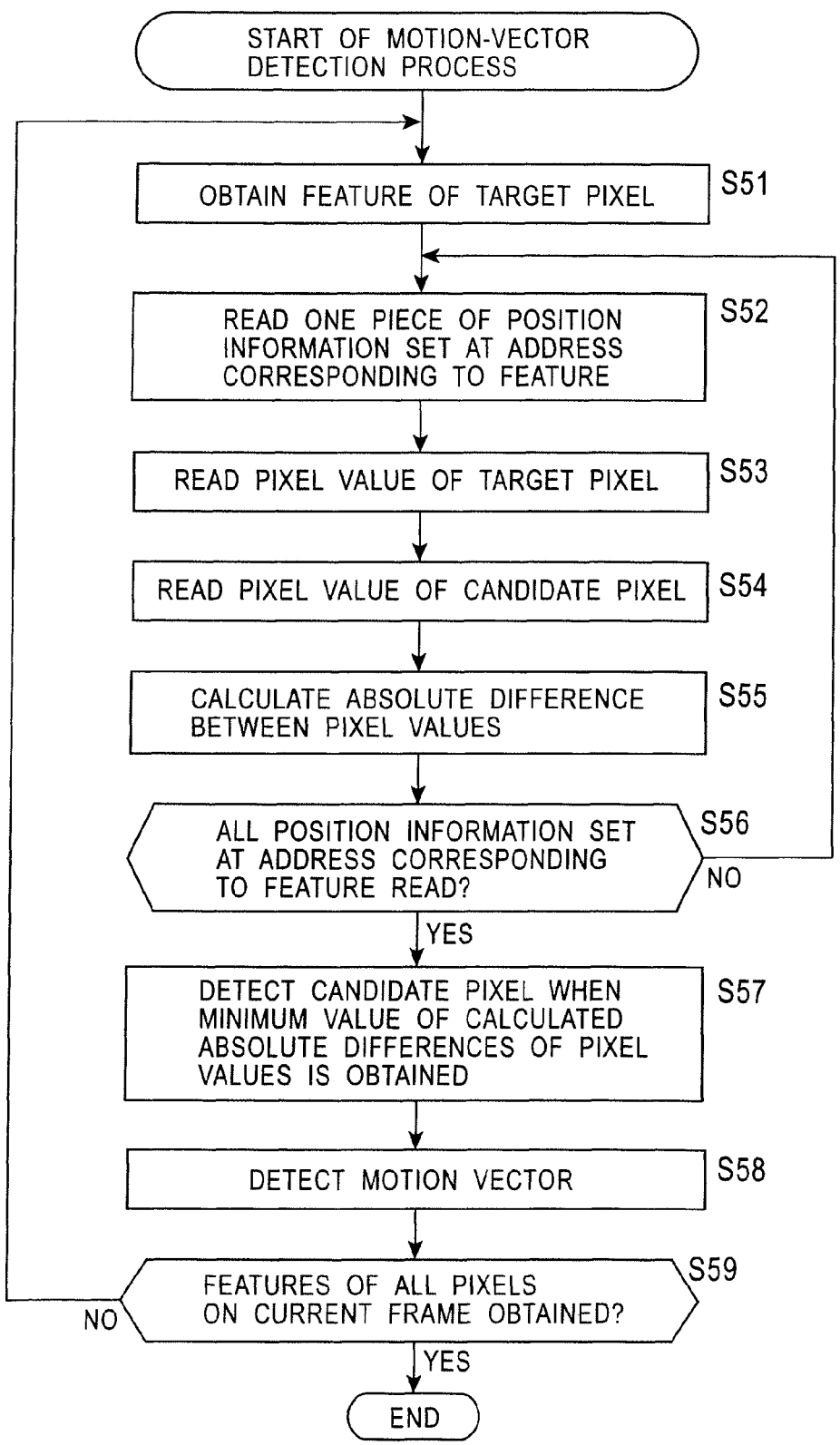
FIG. 7 is a flow chart illustrating a motion-vector detection process.

In steps S75 to S77, since similar processing to that in steps S53 to S55 shown in FIG. 7 is performed, the description thereof will be omitted.

In step S78, a determination is made as to whether the motion-vector detector 66 has selected all position information, read in step S73, within the search area SR. When it is determined that position information that is not selected still remains, the process returns to step S74 in which the motion-vector detector 66 selects the next position information, and the processing thereafter is executed.

In step S78, when it is determined that all position information is selected (when the absolute differences between the target pixel P and all candidate pixels within the search area SR are calculated), the process proceeds to step S79.

In steps S79 to S81, since similar processing to that in steps S57 to S59 shown in FIG. 7 is performed, the description thereof will be omitted.

Figure 12:
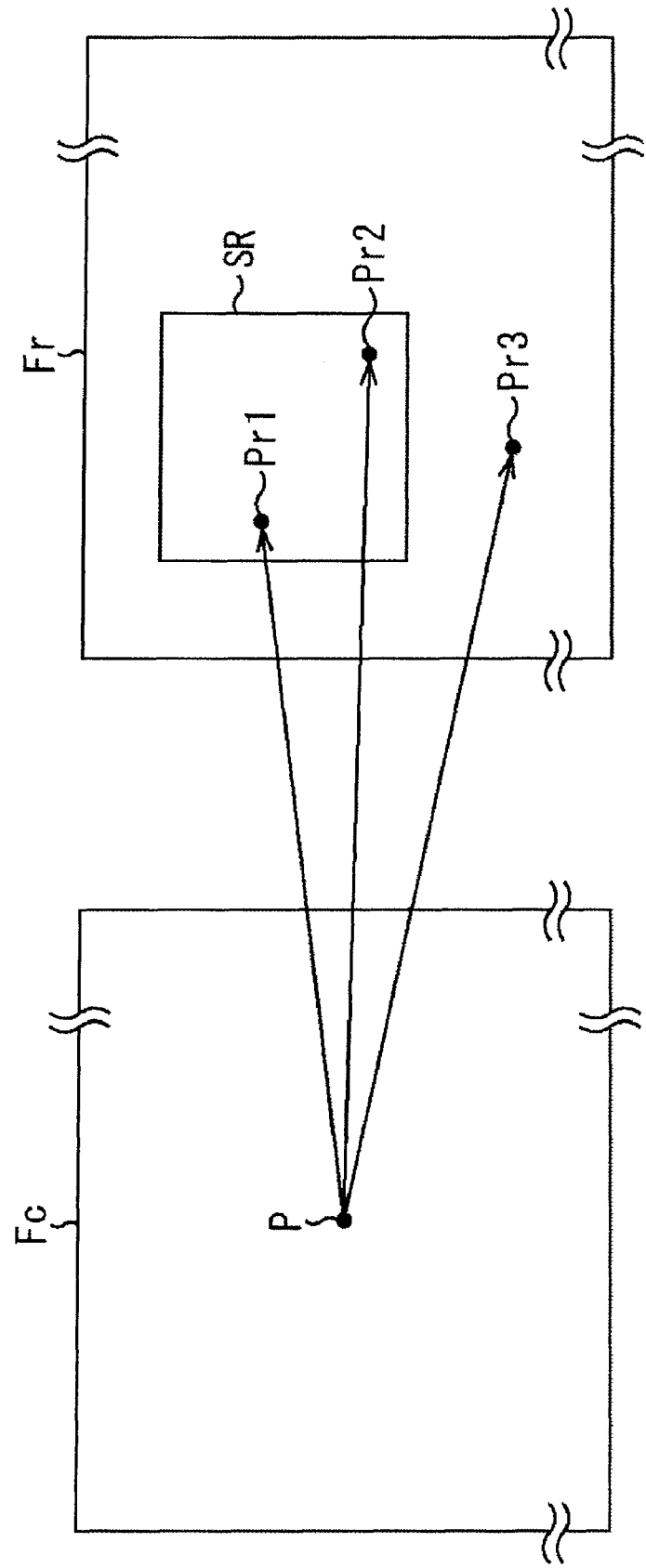
FIG. 12 is a schematic diagram illustrating another motion-vector detection process.

Thus, in this case, for example, when the position information of three candidate pixels Pr1 to Pr3 on the reference frame Fr shown in FIG. 12 is set, in the database 71, at a feature address corresponding to the feature of the target pixel P of the current frame Fc shown in FIG. 12, absolute differences are calculated with respect to the pixel values of the candidate pixels Pr1 and Pr2 set within the search area SR and a candidate pixel Pr from which a minimum absolute difference thereof is calculated is detected as a reference pixel.

In this manner, since absolute differences are calculated with respect to candidate pixels within the search area SR, motion-vector detection can be promptly performed.

In this case as well, the candidate pixels can be determined as described with reference to FIGS. 9 and 10 or absolute differences calculated in step S77 can be weighted.

Another motion-vector detection process will now be described with reference to the flow chart shown in FIG. 13.

In step S91, the motion-vector detector 66 obtains the feature of the target pixel P of the current frame Fc from the feature extracting unit 62. In step S92, the motion-vector detector 66 generates a base block Bb centering at the target pixel P.

Next, in step S93, the motion-vector detector 66 reads, from the database 71 of the database controller 65, one piece of position information that is set and is associated with a feature address corresponding to the feature obtained in step S91.

In step S94, the motion-vector detector 66 generates a reference block Br centering at a pixel (candidate pixel) identified with the position information read in step S93.

Next, in step S95, the motion-vector detector 66 calculates the sum of absolute differences between the pixel values of individual pixels of the base block Bb generated in step S92 and the pixels values of individual pixels of the reference block Br generated in step S94.

In step S96, a determination is made as to whether the motion-vector detector 66 has read all position information associated with a feature address corresponding to the feature obtained in step S91. When it is determined that the position information that is not read still remains, the process returns to step S93 in which the motion-vector detector 66 reads the next position information.

In step S96, when it is determined that all position information is read (when it is determined that the sum of absolute differences with respect to the pixel values of all candidate pixels is calculated), the process proceeds to step S97. In step S97, the motion-vector detector 66 detects a candidate pixel (reference pixel) when the minimum value of the sum of absolute differences that are calculated in step S95 is obtained.

In step S98, the motion-vector detector 66 detects, as a motion vector of the target pixel P, a vector that has a starting point at a pixel on the reference frame Fr which corresponds to the target pixel P of the current frame Fc and that has an end point at the reference pixel detected in step S97.

In step S99, since a similar process to that in step S59 shown in FIG. 7 is performed, the description thereof will be omitted.

In this case as well, the candidate pixel can be determined as described with reference to FIGS. 9 and 10 or absolute differences calculated in step S95 can be weighted.

Figure 14:
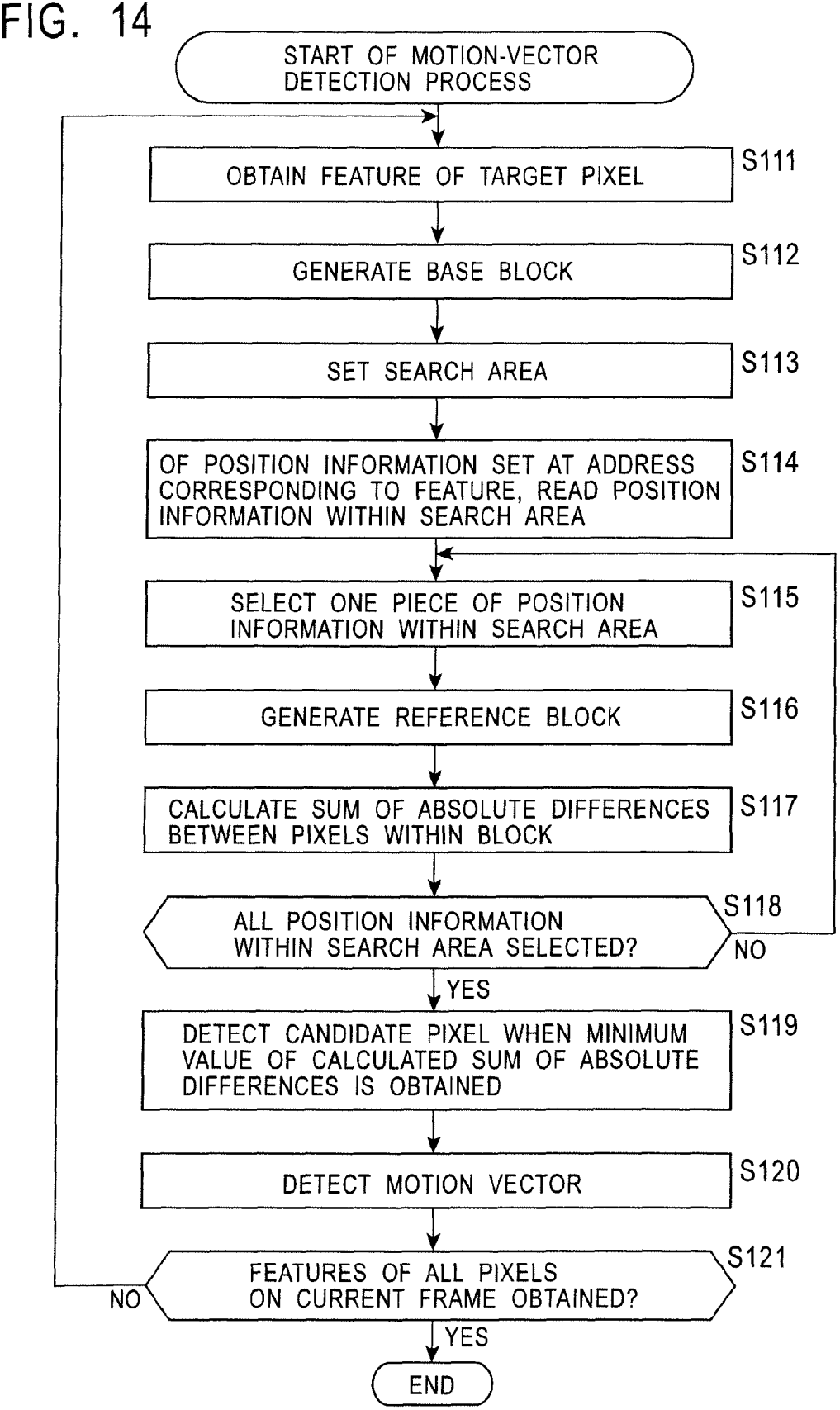
FIG. 14 is a flow chart illustrating another motion-vector detection process.

Still another motion-vector detection process will now be described with reference to the flow chart shown in FIG. 14.

In step S111, the motion-vector detector 66 obtains a feature of the target pixel P of the current frame Fc from the feature extracting unit 62. In step S112, the motion-vector detector 66 generates a base block Bb centering at the target pixel P.

Next, in step S113, the motion-vector detector 66 sets a search area SR corresponding to the position of the target pixel P.

Next, in step S114, of position information that is set in the database 71 of the database controller 65 and that is associated with a feature address corresponding to the feature obtained in step S111, the motion-vector detector 66 reads position information of pixels, set in step S113, within the search area SR.

Next, in step S115, the motion-vector detector 66 selects one of the position information read in step S114.

Figure 13:
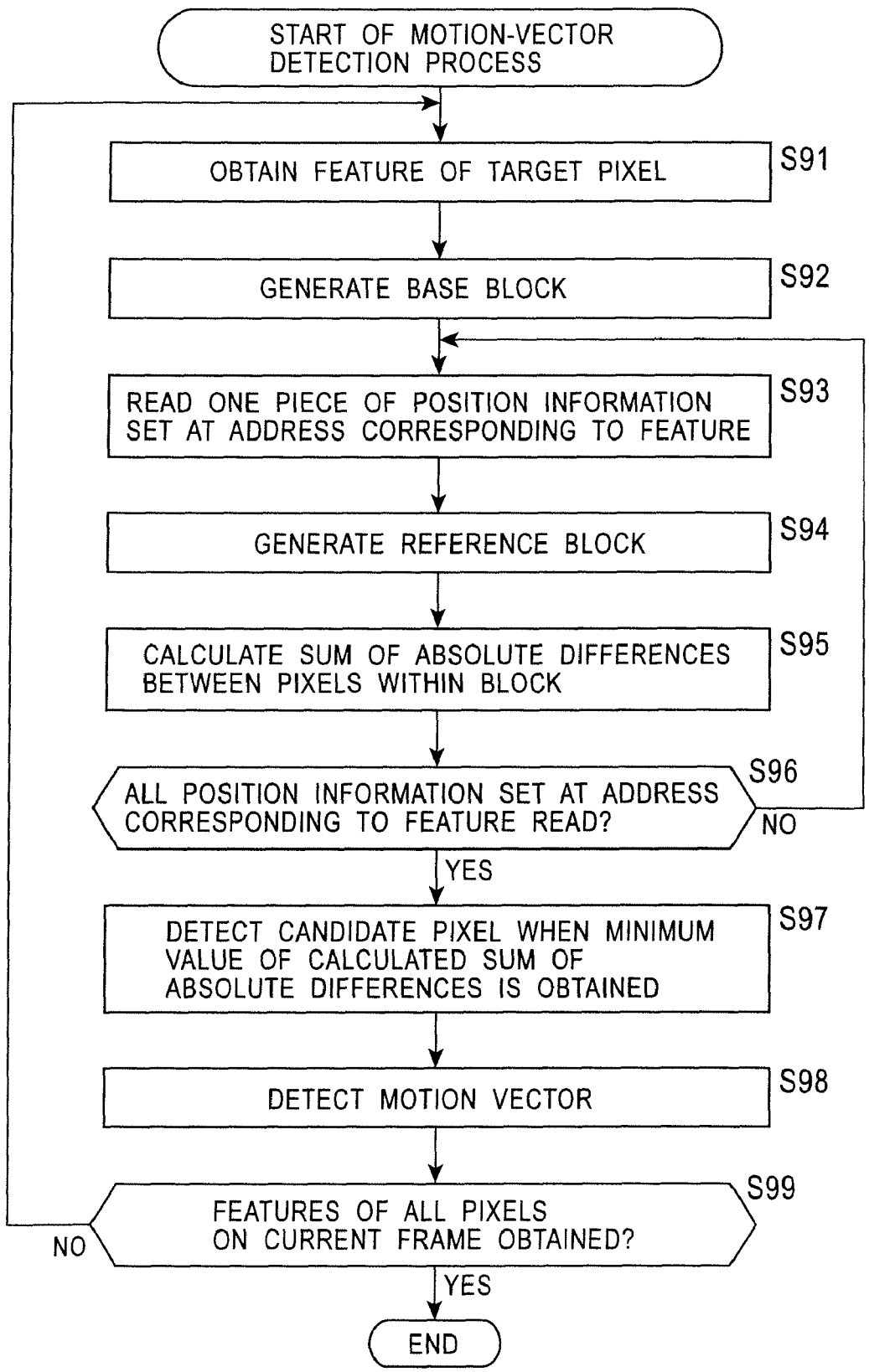
FIG. 13 is a flow chart illustrating another motion-vector detection process.

In steps S116 and S117, since similar processing to that in steps S94 and S95 shown in FIG. 13 is performed, the description thereof will be omitted.

In step S118, a determination is made as to whether the motion-vector detector 66 has selected all position information read in step S114. When it is determined that position information that is not selected still remains, the process returns to step S115, in which the motion-vector detector 66 selects the next position information.

In step S118, when it is determined that all position information is selected, the process proceeds to step S119.

In steps S119 to S121, since similar processing to that in steps S97 to S99 shown in FIG. 13 is performed, the description thereof will be omitted.

In this case as well, the candidate pixels can be determined as described with reference to FIGS. 9 and 10 or the sum of absolute differences calculated in step S117 can be weighted.

Figure 15:
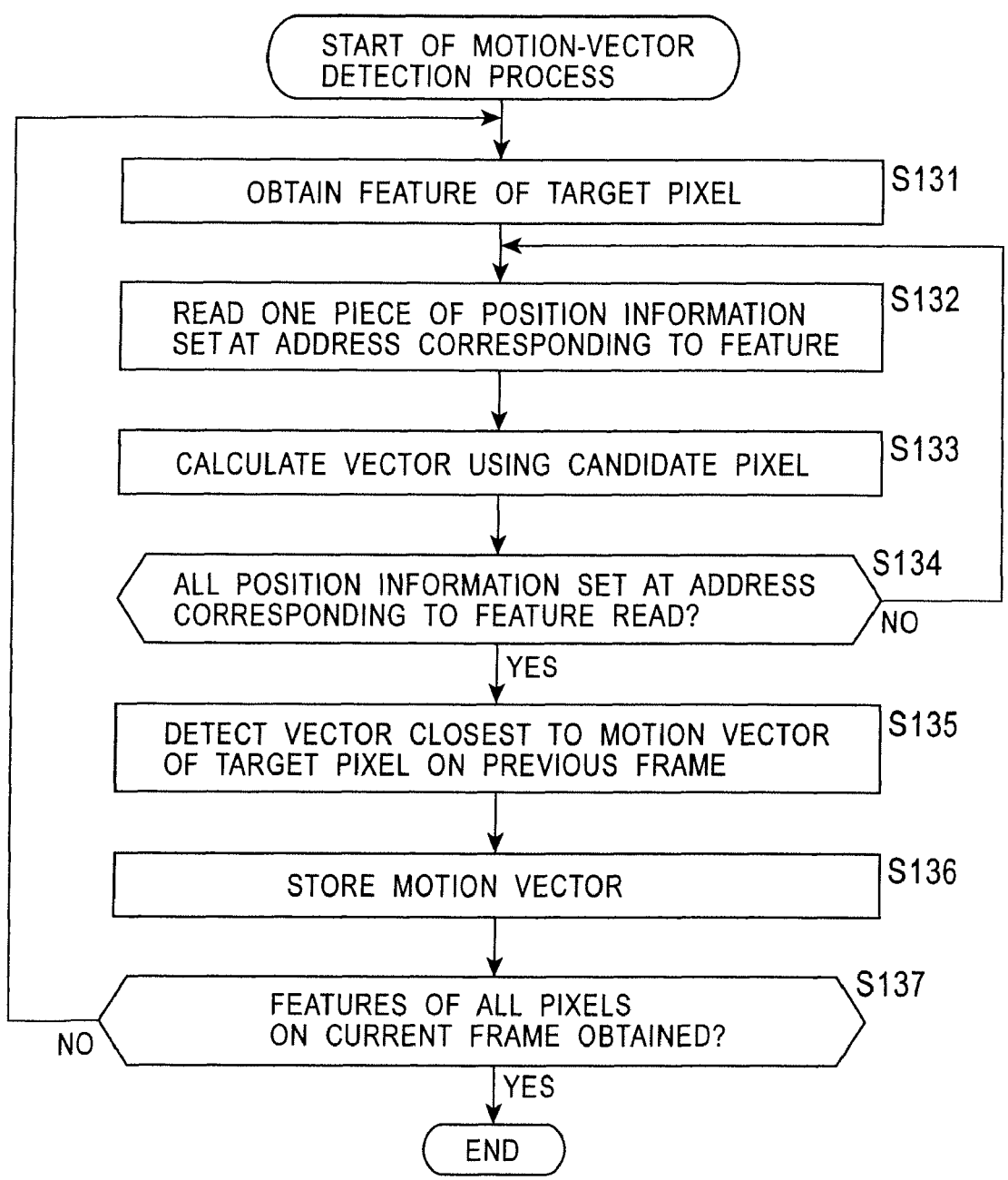
FIG. 15 is a flow chart illustrating another motion-vector detection process.

Still another motion-vector detection process will now be described with reference to the flow chart shown in FIG. 15.

In step S131, the motion-vector detector 66 obtains a feature of the target pixel P from the feature extracting unit 62. In step S132, the motion-vector detector 66 reads, from the database 71 of the database controller 65, one piece of position information set and associated with a feature address corresponding to the feature obtained in step S131.

Next, in step S133, the motion-vector detector 66 determines a vector that has a starting point at a pixel on the reference frame Fr which corresponds to the target pixel P and that has an end point at a candidate pixel identified with the position information read in step S132.

Next, in step S134, a determination is made as to whether the motion-vector detector 66 has read all position information associated with a feature address corresponding to the feature obtained in step S131. When it is determined that position information that is not read still remains, the process returns to step S132 in which the motion-vector detector 66 reads the next position information from the database 71, and the processing thereafter is executed.

In step S134, when it is determined that all position information is read (when vectors for all candidate pixels are determined), the process proceeds to step S135, in which the motion-vector detector 66 detects, of the vectors determined in step S133, a vector that is the closest to a motion vector of the target pixel P on the frame previous to the current frame Fc and sets the detected vector as a motion vector of the target pixel P.

Next, in step S136, the motion vector of the target pixel P is associated with the position of the target pixel P and is stored. Thus, the motion-vector detector 66 obtains, from the stored information, a motion vector of the target pixel P of the frame previous to the current frame Fc.

When the motion vector detected in step S135 is stored in step S136, the process proceeds to step S137. In step S137, a similar process to that in step S59 shown in FIG. 7 is performed, and thus the description thereof will be omitted.

In this case as well, the candidate pixels can be determined as described with reference to FIGS. 9 and 10 or the vectors determined in step S133 can be weighted.

Figure 16:
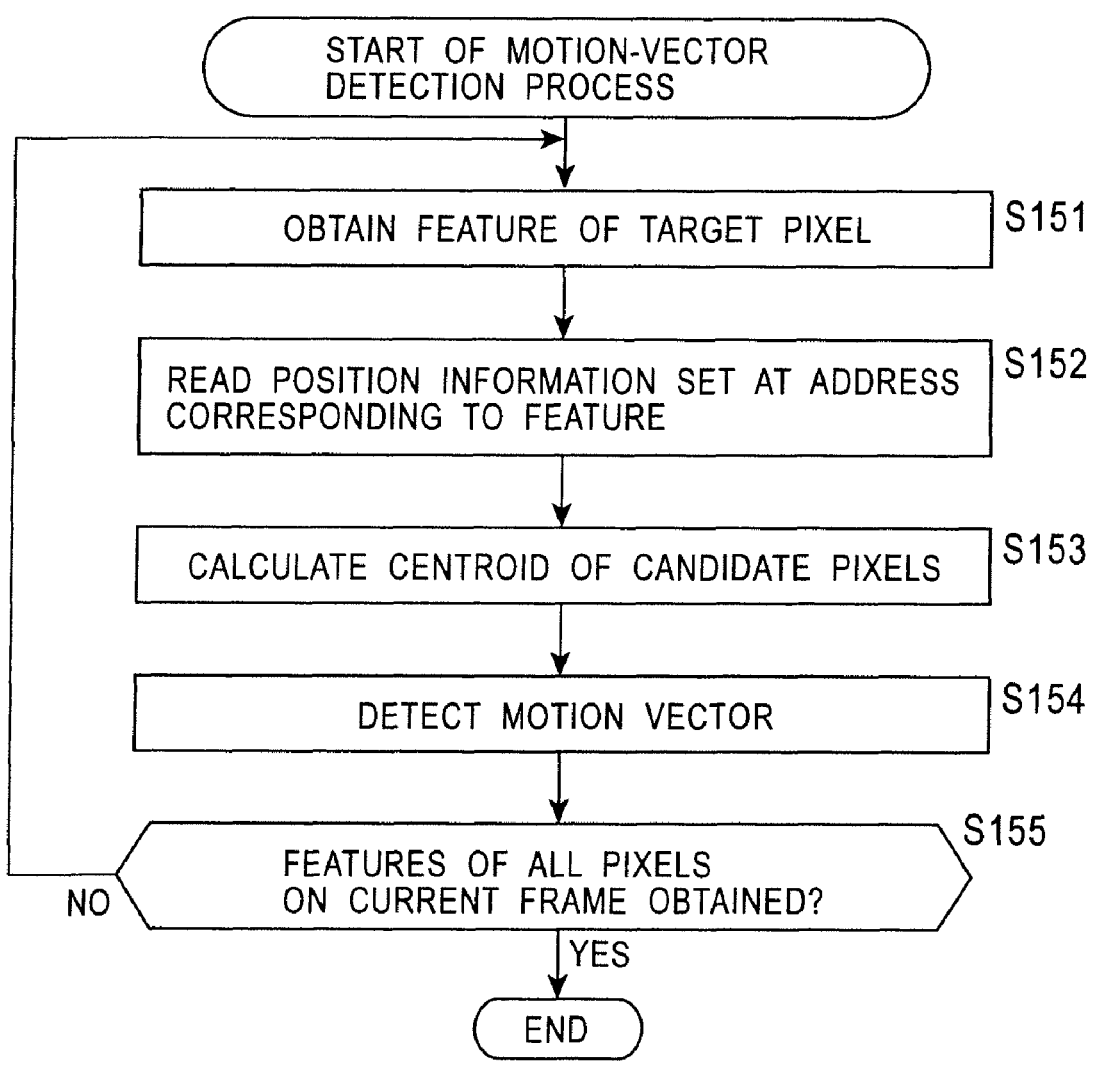
FIG. 16 is a flow chart illustrating another motion-vector detection process.

Still another motion-vector detection process will now be described with reference to the flow chart shown in FIG. 16.

In step S151, the motion-vector detector 66 obtains a feature of the target pixel P of the current frame Fc from the feature extracting unit 62. In step S152, the motion-vector detector 66 reads, from the database 71 of the database controller 65, position information set and associated with a feature address corresponding to the feature obtained in step S151.

Next, in step S153, the motion-vector detector 66 determines the centroid of candidate pixels that are identified with the position information read in step S152.

In step S154, the motion-vector detector 66 detects, as a motion vector of the target pixel P, a vector that has a starting point at a pixel on the reference frame Fr which corresponds to the target pixel P of the current frame Fc and that has an end point at the centroid of the candidate pixels determined in step S153.

In step S155, a similar process to that in step S59 shown in FIG. 7 is performed, and thus the description thereof will be omitted.

Also, in the case of this example, the candidate pixels can be determined as described with reference to FIGS. 9 and 10.

The series of processes described above can also be implemented with software. In such a case, a computer that is implemented with dedicated hardware into which a program that realizes such software is incorporated may be used, or alternatively, such software is installed on, for example, a general-purpose personal computer (FIG. 17), which can execute various functions by installing various programs, from a storage medium.

As shown in FIG. 17, the storage medium is implemented with a packaged medium, on which a program is recorded and which is distributed to a user separately from a computer. Examples of the packaged medium include a magnetic disk 131 (including a flexible disk), an optical disk 132 (including a CD-ROM (Compact Disk-Read Only Memory) and a DVD (Digital Versatile Disk)), a magnetic optical disk 133 (including an MD (Mini-Disk)™), and a semiconductor memory 134.

Herein, steps for writing a program onto a recording medium may or may not be performed according to time series as described above, and may also be performed in parallel or independently.

The present invention allows prompt detection of a motion vector.

What we claim is:

1. An image processing apparatus for compressing an input image using a motion vector, the image processing apparatus comprising:
   means for storing position information of each pixel of a first frame at an address corresponding to a feature of the pixel, the first frame being earlier in time than a second frame;
   means for detecting the position information stored at an address corresponding to a feature of a target pixel of the second frame;
   means for determining differences between a pixel value of the target pixel and pixel values of candidate pixels of the first frame which are identified with the detected position information; and
   means for detecting a motion vector of the target pixel from the position of the target pixel and the position of one of the candidate pixels when a minimum of the differences is determined.

2. The image processing apparatus according to claim 1, further comprising:

means for setting a search area corresponding to the position of the target pixel, wherein the means for determining determines differences between the pixel value of the target pixel and the pixel values of the candidate pixels located within the search area.

3. An image processing method for an image processing apparatus that compresses an input image using a motion vector, the method comprising:

a storing position information of each pixel of a first frame at an address corresponding to a feature of the pixel, the first frame being earlier in time than a second frame;

detecting the position information stored at an address corresponding to a feature of a target pixel of the second frame;

determining differences between a pixel value of the target pixel and pixel values of candidate pixels of the first frame which are identified with the detected position information; and detecting a motion vector of the target pixel from the position of the target pixel and the position of one of the candidate pixels when a minimum of the differences is determined.

4. A non-transitory computer-readable medium including instructions, which when executed by a computer, cause the computer to perform a method of compressing an input image using a motion vector, the method comprising:

storing position information of each pixel of a first frame at an address corresponding to a feature of the pixel, the first frame being earlier in time than a second frame;

detecting the position information stored at an address corresponding to a feature of a target pixel of the second frame;

determining differences between a pixel value of the target pixel and pixel values of candidate pixels of the first frame which are identified with the detected position information; and detecting a motion vector of the target pixel from the position of the target pixel and the position of one of the candidate pixels when a minimum of the differences is determined.

5. An image processing apparatus for compressing an input image using a motion vector, the image processing apparatus comprising:

a memory that stores position information of each pixel of a first frame at an address corresponding to a feature of the pixel, the first frame being earlier in time than a second frame; and a processor configured to detect the position information stored at an address corresponding to a feature of a target pixel of the second frame, determine differences between a pixel value of the target pixel and pixel values of candidate pixels of the first frame which are identified with the detected position information, and detect detecting a motion vector of the target pixel from the position of the target pixel and the position of one of the candidate pixels when a minimum of the differences is determined.

* * * * *